US009830401B2

(12) United States Patent
Prosnitz et al.

(10) Patent No.: US 9,830,401 B2
(45) Date of Patent: Nov. 28, 2017

(54) AUTOMATICALLY SELECTING OPTIMIZATION FILTERS FOR OPTIMIZING WEBPAGES

(71) Applicant: Google Inc., Mountain View, CA (US)

(72) Inventors: Benjamin Joel Prosnitz, San Francisco, CA (US); Michael Piatek, Seattle, WA (US)

(73) Assignee: Google LLC, Mountain View, CA (US)

( * ) Notice: Subject to any disclaimer, the term of this patent is extended or adjusted under 35 U.S.C. 154(b) by 457 days.

(21) Appl. No.: 13/896,263

(22) Filed: May 16, 2013

(65) Prior Publication Data

US 2015/0193398 A1    Jul. 9, 2015

(51) Int. Cl.
*G06F 17/00* (2006.01)
*G06F 17/30* (2006.01)
*G06F 17/22* (2006.01)

(52) U.S. Cl.
CPC ...... *G06F 17/30905* (2013.01); *G06F 17/227* (2013.01)

(58) Field of Classification Search
CPC .................................................... G06F 17/241
See application file for complete search history.

(56) References Cited

U.S. PATENT DOCUMENTS

| 7,152,205 B2* | 12/2006 | Day | G06F 17/227 715/235 |
| 7,315,848 B2* | 1/2008 | Pearse | G06F 17/30887 |
| 2004/0133635 A1* | 7/2004 | Spriestersbach | G06F 17/30905 709/203 |
| 2010/0312821 A1* | 12/2010 | Bannoura | G06F 17/3089 709/203 |
| 2013/0227392 A1* | 8/2013 | Zhong | G06F 17/3089 715/234 |

* cited by examiner

*Primary Examiner* — Scott Baderman
*Assistant Examiner* — Steven Golden
(74) *Attorney, Agent, or Firm* — McDermott Will & Emery LLP

(57) ABSTRACT

In one aspect, a method is provided for automatically validating optimization web filters, including receiving a webpage for optimization, retrieving one or more resources for rendering the webpage, setting values for one or more rendering variables associated with the render engine for rendering the webpage, rendering the webpage using the one or more resources according to the one or more rendering variables, applying a set of filters to the webpage to generate an optimized webpage, rendering the optimized webpage using the one or more resources according to the same values of the one or more rendering variables, comparing the rendered webpage and the rendered optimized webpage, determining if a transformation error condition occurred based on the comparing and storing the one or more optimization filters with respect to the webpage if it is determined that the transformation error condition did not occur.

20 Claims, 4 Drawing Sheets

AUTOMATICALLY SELECTING OPTIMIZATION FILTERS FOR OPTIMIZING WEBPAGES

BACKGROUND

Web page performance may be improved by applying a set of content transformations, called filters or rewriters, to web pages and/or web page resources. These filters may be provided to customers, and the customers may choose a set of filters to apply to improve the performance of their pages. It may be desirable to automatically determine the filters that should be applied to a webpage and to apply the filters without requiring users, who in many instances do not have sufficient knowledge or expertise, to take part in the filter selection process. However, when filters are automatically applied, some filters may break the functionality of certain web pages due to specific characteristics of the page. An example of this is the defer_javascript filter, which delays execution of Javascript until the page has loaded. If javascript execution is delayed, a document.write( ) call, which writes to the current end of the page, could end up writing content to a different region than intended. Thus, it is necessary to validate the transformation of a page and to find a set of filters that would not break the page when applied to the page.

SUMMARY

The disclosed subject matter relates to a computer-implemented method for automatically validating optimization web filters, the method comprising receiving a webpage for optimization. The method further comprising retrieving one or more resources for rendering the webpage. The method further comprising setting the values for one or more rendering variables, the variables being associated with the render engine for rendering the webpage. The method further comprising rendering the webpage using the one or more resources according to the values of the one or more rendering variables. The method further comprising retrieving one or more resources for rendering an optimized webpage, the one or more resources for the rendering the optimized webpage being the same as the one or more resources for rendering the webpage. The method further comprising applying a set of filters to the webpage to generate an optimized webpage. The method further comprising rendering the optimized webpage using the one or more resources according to the same values of the one or more rendering variables. The method further comprising comparing the rendered webpage and the rendered optimized webpage. The method further comprising determining if a transformation error condition occurred based on the comparing and storing the one or more optimization filters with respect to the webpage if it is determined that the transformation error condition did not occur.

The disclosed subject matter also relates to a system for automatically validating optimization web filters, the system comprising one or more processors and a machine-readable medium comprising instructions stored therein, which when executed by the processors, cause the processors to perform operations comprising receiving a request to select a set of optimal optimization filters for optimizing a webpage. The operations further comprising identifying one or more available optimization filters for optimizing the webpage. The operations further comprising generating a set of filters including the one or more available optimization filters. The operations further comprising retrieving one or more resources for rendering the webpage. The operations further comprising setting values for one or more rendering variables, the variables being associated with the render engine for rendering the webpage, the one or more rendering variables comprising time of day and a last modified date value. The operations further comprising rendering the webpage using the one or more resources according to the values of the one or more rendering variables. The operations further comprising applying the set of filters to the webpage to generate an optimized webpage. The operations further comprising rendering the optimized webpage using the same one or more resources according to the same values of the one or more rendering variables. The operations further comprising comparing the rendered webpage and the rendered optimized webpage. The operations further comprising determining if a transformation error occurred based on the comparing, wherein the transformation error comprises a pre-defined level of difference between the webpage and the optimized webpage and identifying the one or more optimization filters as the set of optimal optimization filters if it is determined that the transformation error did not occur.

The disclosed subject matter also relates to a machine-readable medium including instructions stored therein, which when executed by a machine, cause the machine to perform operations comprising receiving a webpage for optimization. The operations further comprising generating a set of filters including one or more available optimization filters for optimizing the webpage. The operations further comprising retrieving one or more resources for rendering the webpage. The operations further comprising setting the values for one or more rendering variables, the variables being associated with the render engine for rendering the webpage. The operations further comprising rendering the webpage using the one or more resources according to the values of the one or more rendering variables. The operations further comprising applying the set of filters to the webpage to generate an optimized webpage. The operations further comprising rendering the optimized webpage using the same one or more resources according to the same values of the one or more rendering variables. The operations further comprising comparing the rendered webpage and the rendered optimized webpage. The operations further comprising determining if a transformation error occurred based on the comparing, wherein the transformation error comprises a difference between the webpage and the optimized webpage and storing the one or more optimization filters if it is determined that the transformation error did not occur.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
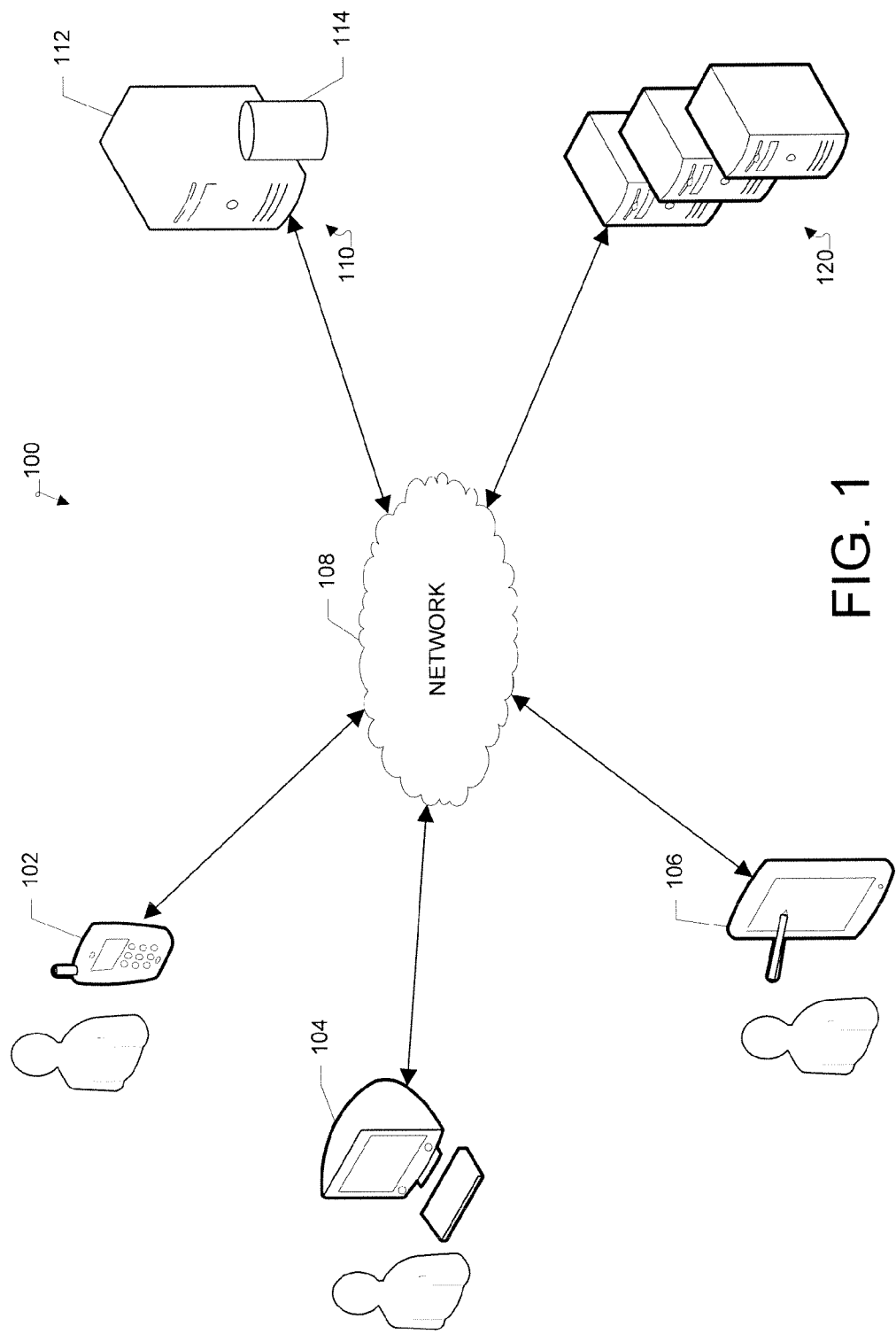
FIG. 1 illustrates an example client-server network environment, which provides for facilitating automatically selecting an optimal set of filters for optimizing a webpage.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The subject disclosure provides a system and method for determining when a set of filters used for optimization of a webpage ("page") cause an error in the page, either from a design or functionality perspective, as a result of the transformation. The system and method facilitate automatically determining the maximal set of filters that can be applied without a negative effect on a page. In some implementations, for a filter, the sites and/or pages that break in response to the filter (e.g., a transformation error occurs at the page in response to the filter being applied to the page) can be automatically identified. This is helpful in improving the filter for future use.

While a break in the visual layout or functionality of a page may be obvious to users, from an algorithmic perspective, it is not simple to determine when differences between two renders are meaningful. The first challenge is to find a technique that can correctly detect broken pages (e.g., a page where the optimization causes meaningful differences between the optimized page and the original page). Several techniques exist for determining when a page breaks in response to a transformation. However, most these techniques have fall backs that make them unsatisfactory for detecting transformation errors.

For example, JavaScript console errors may be used to determine errors on a page. If JavaScript functionality on a page is broken, it seems intuitively likely that new or different JavaScript errors will be produced. However, this is not always true in practice, due, for example, to the fact that often there are some errors on a page that are transformed into different errors after the page is transformed. The relationship between the new and old errors can be unclear and new errors are unlikely to occur from a page that originally had no errors. As a result, JavaScript console errors are not an accurate technique to determine if a page is broken.

Another possibility is using status codes to analyze page differences (e.g., based on the number of 404 errors on a transformed page vs. the original page). However, resources loaded by the transformation tools are different from those loaded normally due to factors such as using content delivery networks. Additionally, fewer 404 errors may occur in the transformed page due to inlining of content. Thus, the comparison of the number of error codes may not provide an accurate indication of whether the transformation caused the page to break.

Rendered image differences are another technique that may intuitively provide an indication of whether a transformation causes errors as there is a strong relationship between differences in the visual render of a page and the existences of breakages. However, it is not easy to determine if the image differences imply actual functional differences or that the design of the page has changed in a meaningful way.

Computing the raw difference between two renders is fairly effective at identifying pages to investigate for errors. However, there are many false positives due to changing page content and minor layout changes that have little effect on design or functionality. Additionally, in some cases, regions of the page are shifted by unperceivable amounts. A raw image diff can sometimes detect the entire region as different if few of the pixels match.

To address these challenges the techniques described herein facilitate addressing the nondeterministic nature of the page generation process to allow for a more accurate comparison of an original page and the transformed version of the page. Since two renders are being compared for validation, nondeterminism across renders can make it difficult to isolate the effect of the filters. Techniques provided herein reduce nondeterminism in the page generation process. Page generation nondeterminism may occur due to server-side and/or client-side events during rendering of a page.

Serve-side nondeterministic events may occur due to changes in content at the server (e.g., in response to the content of the page being updated, such as updated new stories, ads, dates on pages and other updated content due to different contextual factors such as passage of time). When content at a server is updated, requests to the server may result in different content for the page, and thus different pages. Because the validation compares two pages that are generated at different times, introducing a possibility for content updates or modifications at the server, the difference in pages causes false positives when validating the transformation. For instance, if content on the page (e.g., news stories, ads) were to update, the validator would observe large visual and structural changes in the page.

In order to avoid this problem, a caching proxy element is introduced. The caching proxy element acts as an agent between the render engine (e.g., Webkit Headless) and the external servers, for all outgoing requests. The caching proxy receives requests from the render engine and returns the same response to all requests for a specific URL. That is, when a request for content is received for a specific URL, the caching proxy element determines if the request is being received for the first time for that URL. If so, the request is provided to one or more remote servers maintaining resources for rendering the page. One or more resources are received in the response to the request and stored, as well as provided in response to the request. For all other requests, when the caching proxy determines that the response is not being issued for the first time, the caching proxy retrieves the one or more stored resources for the URL and provides the one or more resources in response to the request, such that the resources returned to a render engine for a specific URL are always identical. This technique ensures that pages being compared to one another are rendered according to the same content, even when the pages are rendered at different instances of time or under different circumstances.

A page may also change over time or under different circumstances due to changes on the client side. It is important to reduce client side nondeterminism for the validation methods to be effective. Nondeterministic events at the client side may be caused due to several factors including Java execution order, cookies, time of day, last modified date, resource load order and/or font nondeterminism. JavaScript execution in the render engine (e.g., Webkit Headless) attempts to be deterministic so long as the inputs are deterministic. These inputs include whether a resource successfully loads, the time of day, last modified time and cookies.

The time of the day used in the browser can be set such that the scripts that depend on time of day will act consistently. The last modified time can also be set in headers using, for example, a customized fetcher. With these two changes the render engine perceives the time to be a user-specified date so date dependent scripts are consistent. The cookies are made deterministic because the render engine (e.g., Webkit Headless) does not allow cookies to persist and the headers that set cookies are cached by the caching proxy.

These approaches, on the server side and/or the client side, ensure that the content being rendered and the manner in which the rendering occurs are consistent across multiple renders of the same page, thus allowing for a comparison to find errors caused by the transformation. However, even where content and layout of pages is made consistent, the pages may be subject to natural changes. In order to deal with these subtle variations in pages, stable visual regions within a page are identified by rendering a page (e.g., the original page and/or optimized page) multiple times and identifying the parts of the image that change. These changing "unstable" pixel regions are expanded to the nearest enclosing rectangle and only the remaining stable regions are compared. In this manner, the pages may be compared taking into account changes that occur naturally (e.g., not by the transformation). Thus, where a change in stable regions is determined, it is more likely that the change was caused by the transformation rather than by other causes.

Once it is determined that an error occurred due to the set of filters being applied to the page, the comparison process may be repeated with different sets of filters to determine the optimal set of filters that do not break the page (i.e., the comparison does not show transformation errors). The algorithm may test an increasing set of filters until a combination breaks a page and/or may reversely test more expansive sets decreasing the number of filters until a set that does not break the page is identified. In some implementations, the algorithm first starts with the core filters and tests for breakages, if no breakages occur, a more expansive list is tested. Otherwise, a narrower set of filters is tested. For example, the list may be divided (e.g., into two or more lists). The division may be random or based on historical data. The results are used to generate new lists (e.g., if the sets are broken or neither set is broken), until a minimal set of filters is generated which do not break the page. The set of filters that do not break the page (e.g., the original set of filters or a subset of filters) may be stored for later rendering of the same or similar pages in response to an optimization request. For filters identified as breaking a page (e.g., filters that are removed form the initial set because of the page breaking), the information regarding the page along with the filter may be used to fix the filter.

FIG. 1 illustrates an example client-server network environment, which provides for facilitating automatically selecting an optimal set of filters for optimizing a webpage. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate automatically selecting optimization filters for webpages being provided for display to users at electronic devices 102, 104, 106. Server 110 may further be in communication with remote servers 120 either through the network 108 or through other network or communication means.

In one example, the one or more other remote servers 120 perform various functionalities and/or storage capabilities described herein with regard to the server 110 either alone or in combination with server 110. One or more servers 120 may further comprise servers providing resources for one or more webpages, or maintaining one or more webpages. In one example, one or more servers may further comprise storage for storing metrics and/or data regarding the optimization filters.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through the HTTP communication protocol. Other communication protocols may also be facilitated including for example, XMPP communication, for some or all communications between the client devices 102, 104, 106, server 110 and one or more remote servers 120 (e.g., through network 108).

Figure 2:
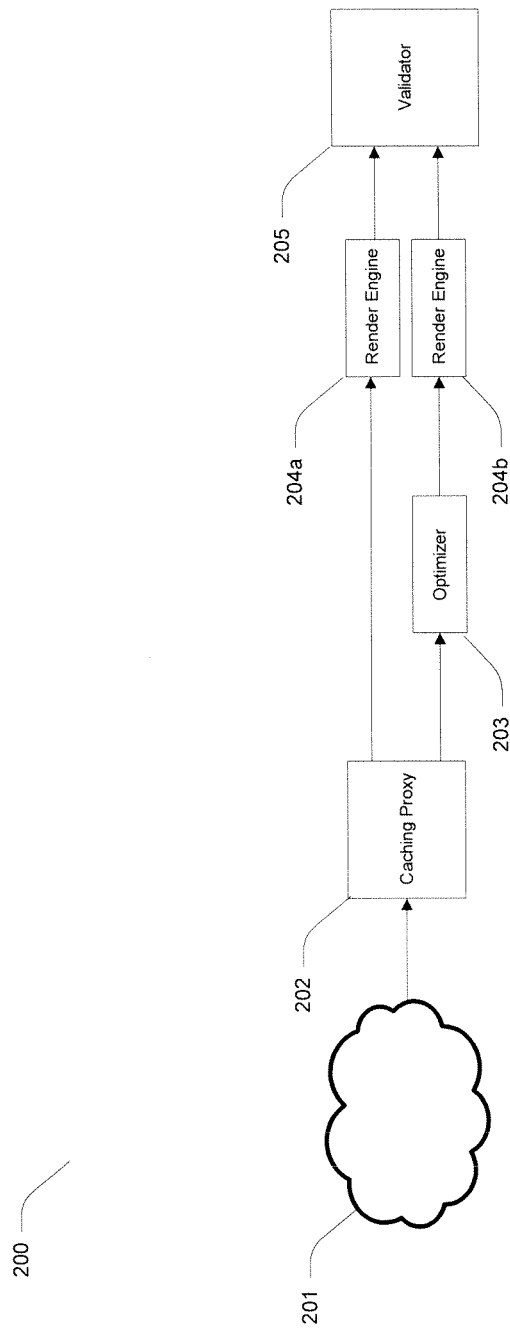
FIG. 2 illustrates a system flow diagram of an example system for determining an optimal set of filters for optimizing a webpage.

FIG. 2 illustrates a system flow diagram of an example system 200 for determining an optimal set of filters for optimizing a webpage. The system 200 includes a network 201, caching proxy 202, an optimizer 203, two instances of the render engine 204, labeled as render engine 204a and render engine 204b, and a validator 205.

Network 201 can be a public communication network (e.g., the Internet, cellular data network, dialup modems over a telephone network) or a private communications network (e.g., private LAN, leased lines). Further, network 201 can include, but is not limited to, any one or more of the following network topologies, including a bus network, a star network, a ring network, a mesh network, a star-bus network, a tree or hierarchical network, and the like. In some examples, the network 201 may be similar to network 108 of FIG. 1. In one example, any outgoing requests, including resource requests for pages, is sent to resource providers (e.g., at one or more remote servers 120) over network 201.

Caching proxy component 202 is communicationally coupled to network 201 and is further communicationally coupled to the render engine 204a and render engine 204b (through optimizer 203). The caching proxy 202 acts as an additional layer that caches the resources for rendering one or more webpages. The caching proxy 202 acts as an agent between the render engine 204a and 204b and the external servers, for all outgoing requests. Serve-side nondeterministic events may occur due to changes in content at the server(s) (e.g., in response to the content of the page being updated, such updated new stories, ads, dates on pages and other updated content due to different contextual factors such as passage of time). When content at a server is updated, requests to the server may result in different content for the page, and thus different pages.

In order to avoid this problem, the caching proxy 202 is configured to receive requests from the render engines 204a and/or 204b and return the same response to a request for a specific URL. That is, when a request for content is received for a specific URL from render engine 204a or 204b, the caching proxy 202 is configured to determine if the request is being received for the first time for that URL. If so, the caching proxy 202 is configured to send the request to servers over network 201. The caching proxy 202 is configured to receive the content and store, as well as provide, the content, in response to the request to render engine 204a or 204b. For requests that the caching proxy 202 determines are is not being issued for the first time for a specific URL, the caching proxy 202 is configured to retrieve the stored resources and provide the stored resources in response to the request to render engine 204a or 204b, such that the resources returned in response to a render engine request for the specific URL are always identical.

Render engines 204a and 204b execute and render the page using the resources provided by caching proxy 201. The render engine 204b feeds through the optimizer 203, which includes the optimization filters and may optimize the one or more page resources before providing the page resources to the render engine 204b. The validator 205 is configured to receive the output of render engine 204a, which is the rendered webpage, and the output of render engine 204b, the rendered optimized webpage, and compare the two pages. In response to the comparison, the validator is configured to determine if the set of filters used by the optimizer 203 to optimize the webpage breaks the page.

Figure 3:
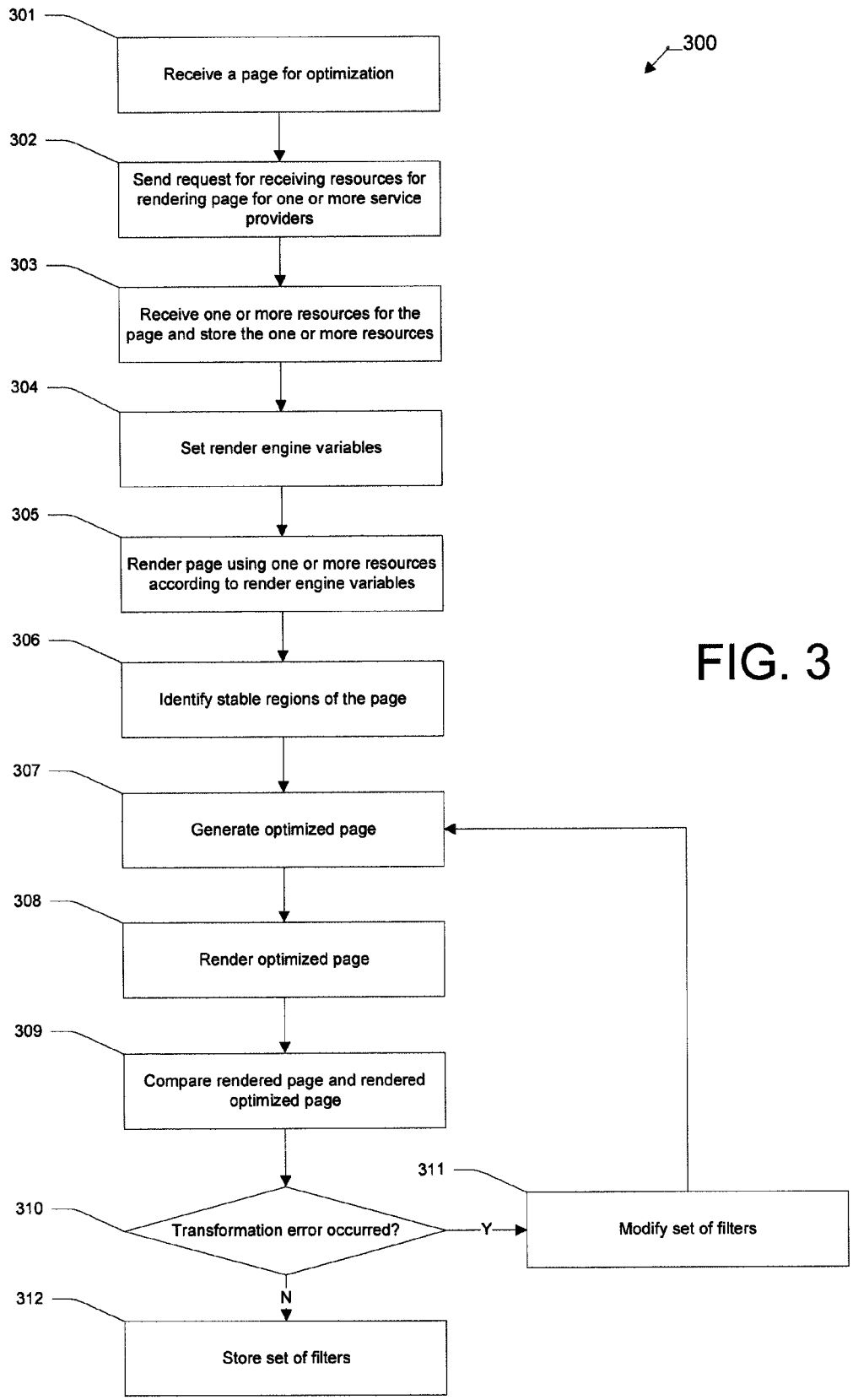
FIG. 3 illustrates a flow diagram of an example process for determining an optimal set of filters for optimizing a webpage.

FIG. 3 illustrates a flow diagram of an example process 300 for determining an optimal set of filters for optimizing a webpage. In step 301, a page is received for optimization. The page may be received, for example, in response to a user request to view a page, from a server hosting the page, and may be optimized before being rendered and provided for display to a user at a client device.

In step 302, a request to receive resources (e.g., content) for rendering the page is generated and sent to one or more resource providers (e.g., server(s)). In step 303, one or more resources for the page are received and cached. Serve-side nondeterministic events may occur due to changes in content at the resource provider, for example, due to updates to the content of the page such as updated news stories, ads, dates on pages and other updated content due to different contextual factors such as passage of time.

When content at a resource provider is updated, requests relating to the same page may result in different resources for the page, and thus different rendered pages. To facilitate a comparison between the initially rendered page and a page after it has been optimized, while taking into account possible update or modification to one or more of the resources, a caching proxy element is introduced. The caching proxy acts as an agent between the render engine and the resource provider(s) (e.g., one or more external servers), for all outgoing requests. The caching proxy receives requests from the render engine and returns the same response to all requests for a specific URL.

When a request for content is received for a specific URL, the caching proxy element determines if the request is being received for the first time for that URL. If so, the request is provided to resources providers. The one or more resources received in response to the request are stored as well as provided in response to the request (e.g., as shown in step 302). For all other requests, when the caching proxy determines that the response is not being issued for the first time, the caching proxy retrieves the one or more resources for the specific URL stored previously, and provides the resources in response to the request, such that the resources for the specific URL are always identical throughout the process 300 for determining the optimal set of optimization filters for optimizing a page.

In step 304, render engine variables such as time of day, last modified time and/or load order of the render engine are set to further ensure consistency in the comparison process by reducing client side variations. Variations in rendering of a page with identical resources may occur (e.g., at the client side) due to several factors including Java execution order, cookies, time of day, last modified date, resource load order and/or font nondeterminism at the render engine. In some implementations, JavaScript execution in the render engine attempts to be deterministic so long as the inputs are deterministic. These inputs may include whether a resource successfully loads, the time of day, last modified time and/or cookies.

In some implementations, the time of the day used in the browser can be set such that the scripts that depend on time of day will act consistently. The last modified time can also be set in headers, for example, by using a customized fetcher. With these two changes the render engine perceives the time to be a user-specified date so date dependent scripts are consistent. To ensure that cookies are deterministic, is some implementations, the render engine does not allow cookies to persist and the headers that set cookies may be cached by the caching proxy.

In step 305, the render engine renders the page using the one or more cached resources and according to the render engine variables. In some instances, even where content and layout of pages is made consistent, the pages may be subject to variations. In order to deal with these variations, in step 306, stable visual regions within a page are identified. In one example, stable regions are identified by rendering a page (e.g., the original page and/or optimized page) multiple times, using the one or more cached resources and the set render engine variables, and comparing the multiple rendered pages to identify the regions of the page that change. These changing regions are identified as "unstable" regions, and may be excluded from the comparison when comparing the rendered page with the rendered page after optimization. In some examples, the unstable pixel regions may be expanded to the nearest enclosing rectangle and only the remaining stable regions may be compared.

In some examples, stable regions may be determined by rendering multiple instances of the page before optimization and/or after optimization. In one example, step 305 may be performed at any time during the process once the resources are received and cached, and the rendering variables are set, before and/or after the optimization of the page has occurred.

In step 307, a set of optimization filters are applied to the page (e.g., the page and/or one or more page resources) to generate an optimized page. The set of filters may include one or more filters that provide optimization of the page and/or page resources. After the optimization filters are applied, in step 308, the optimized page is rendered at the render engine using the one or more cached resources and the set rendering variables.

In step 309, the rendered optimized page and the rendered original page are compared to one another to determine if the transformation caused the page to break. In one example, where stable regions of a page (e.g., based on multiple renders of the page and/or optimized page) are determined, the comparison may be performed by comparing those regions of the page and optimized page that are identified as stable regions.

When a change in stable regions is determined, it is more likely that the change was caused by the transformation rather than by other causes. Accordingly, comparison of stable regions of the page and optimized page take into account changes that occur for reasons that are not related to the optimization. If the comparison of the pages and the optimized pages shows differences in the rendered pages, then it is concluded that a transformation error occurred because the one or more optimization filters of the set of optimization filters caused the page to break. In some examples, some margin of error may be allowed when performing the comparison and a transformation error may be detected if differences equal to and/or above the margin of error are detected. In addition the error detection may take into account factors that may cause differences that are not visible to the user such as execution order and/or shifts in the content. In these instances, the differences may not result in an error being detected since it does not indicate an actual page break.

In step 310, it is determined if a transformation error has occurred in response to the optimization. If, in step 310, a transformation error is detected, in step 311 the set of optimization filters is modified. The process next returns to step 307 and the page is optimized using the modified set of filters. In step 308, the page optimized using the modified set of filters is rendered using the one or more cached resources and rendering variables to render a second optimized page. Next in step 309, the rendered second optimized page is compared to the original page to determine if a transformation error occurred. If in step 310, it is determined that a transformation error occurred, the process then returns to step 311 and repeats the process using a new modified set of optimization filters until in step 310 it is determined that no transformation errors occurred (or the transformation error is within a margin of error).

The algorithm may test an increasing set of filters until a combination breaks a page and/or may reversely test more expansive sets, decreasing the number of filters until a set that does not break the page is identified. In some implementations, the set is modified to include the core filters. If no breakages occur, a more expansive list is tested. Otherwise, a narrower set of filters is tested. For example, the list of filters may be divided (e.g., into two or more lists). The division may be random or based on historical data. The results are used to generate new modified filter sets (e.g., if the sets are broken or neither set is broken), until an optimal set of filters is generated which do not break the page.

If, in step 310, it is determined that no transformation errors occurred with respect to the optimized page (e.g., optimized using the original set of filters or a modified set of filters), the process continues to step 312. In step 312, the current set of filters used to generate the optimized page that did not result in detecting any transformation errors (e.g., the original set of filters or a modified set of filters) may be stored for later rendering of the same or similar pages in response to an optimization request. For filters identified as breaking a page (e.g., filters that are removed form the initial set because of the page breaking), the information regarding the page along with the filter may be used to fix the filter.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
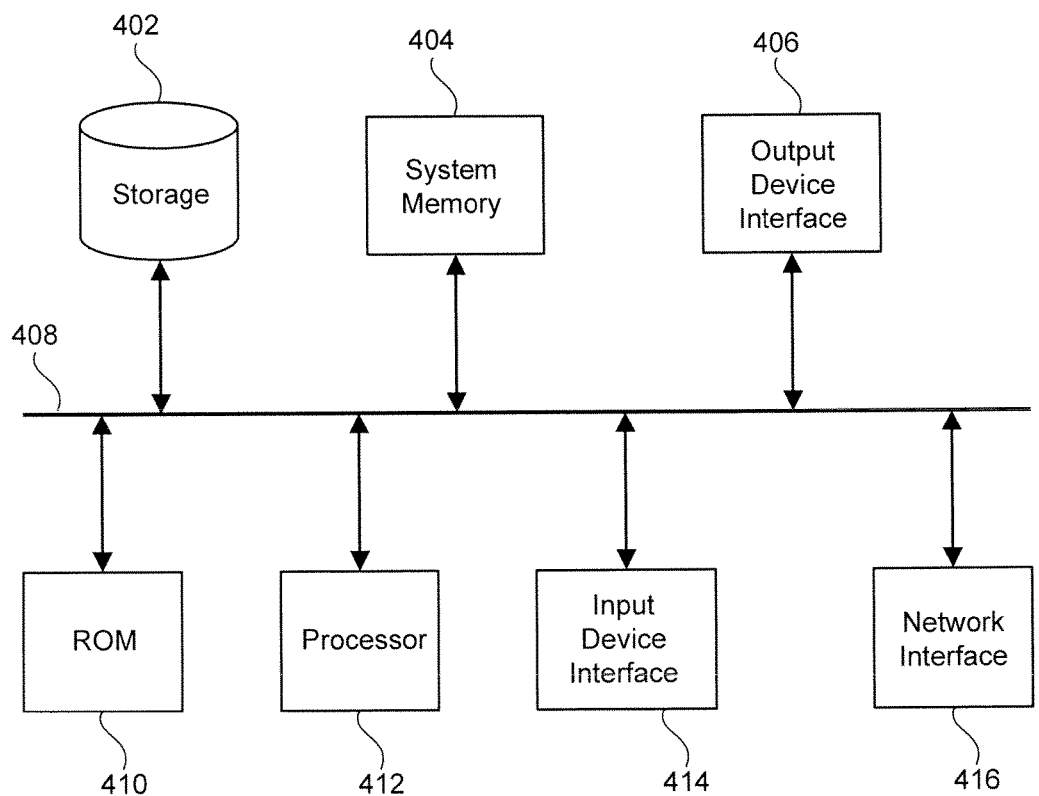
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for identifying an optimal set of optimization filters for optimizing a webpage. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method comprising:
   receiving a webpage for optimization;
   retrieving one or more resources for rendering the webpage;
   setting values for one or more rendering variables, the one or more rendering variables being associated with a render engine for rendering the webpage;
   rendering, by a first instance of the render engine, the webpage using the one or more resources according to the values of the one or more rendering variables;
   retrieving the one or more resources for rendering an optimized webpage;
   applying a set of filters to the webpage to generate an optimized webpage, the set of filters comprising one or more optimization filters;
   rendering, by a second instance of the render engine, the optimized webpage using the one or more resources according to the same values of the one or more rendering variables;
   comparing the webpage rendered by the first instance of the render engine using the one or more resources and the optimized webpage rendered by the second instance of the render engine using the one or more resources;
   determining if a transformation error condition occurred based on the comparing;
   storing the one or more optimization filters with respect to the webpage if it is determined that the transformation error condition did not occur; and
   responsive to determining that the transformation error condition occurred, automatically modifying the set of filters to generate a subset of filters, the subset of filters including a subset of the one or more optimization filters.

2. The method of claim 1, wherein the retrieving the one or more resources for rendering the webpage comprises:
   determining if the one or more resources were previously requested with respect to the webpage; and
   generating a request to one or more resource providers for the one or more resources if the one or more resources were not previously requested with respect to the webpage; and
   receiving the one or more resources in response to the request.

3. The method of claim 2, the method further comprising:
   storing the one or more resources in local storage for later retrieval.

4. The method of claim 3, wherein retrieving the one or more resources for rendering an optimized webpage comprises retrieving the one or more resources from local storage.

5. The method of claim 1, further comprising:
   rendering, by the first instance of the render engine, the webpage a plurality of times using the one or more resources for rendering the webpage according to the values of the one or more rendering variables to generate a plurality of rendered instances of the webpage;

comparing the plurality of rendered instances of the webpage; and identifying stable regions of the webpage based on the comparing, wherein stable regions of the webpage comprise regions that are not changed in the plurality of rendered instances of the webpage.

6. The method of claim 5, wherein the comparing the webpage rendered using the one or more resources and the optimized webpage rendered using the one or more resources comprises:

comparing the stable regions of the webpage rendered using the one or more resources and corresponding regions of the optimized webpage rendered using the one or more resources.

7. The method of claim 1, further comprising:

applying the subset of filters to the webpage to generate a second optimized webpage;

rendering the second optimized webpage using the one or more resources according to the same values of the one or more rendering variables;

comparing the webpage rendered using the one or more resources and the second optimized webpage rendered using the one or more resources;

determining if another transformation error condition occurred based on the comparing; and storing the one or more optimization filters of the subset of filters with respect to the webpage if it is determined that the another transformation error condition did not occur.

8. The method of claim 7, further comprising:

modifying the subset of filters to include a different combination of the set of filters until it is determined that the transformation error condition did not occur, if it is determined that the transformation error condition occurred.

9. The method of claim 7, further comprising:

modifying the subset of filters to generate another subset of filters when it is determined that the another transformation error condition occurred, the another subset of filters including another subset of the subset of the one or more optimization filters.

10. The method of claim 1, wherein the one or more rendering variables include a time of day value and a last modified date value.

11. The method of claim 1, wherein the transformation error condition comprises a pre-defined level of difference between the rendered webpage and the rendered optimized webpage.

12. A system comprising:

one or more processors; and a machine-readable medium comprising instructions stored therein, which when executed by the processors, cause the processors to perform operations comprising:

receiving a request to select a set of optimal optimization filters for optimizing a webpage;

identifying one or more available optimization filters for optimizing the webpage;

generating a set of filters including the one or more available optimization filters;

retrieving one or more resources for rendering the webpage;

setting values for one or more rendering variables, the one or more rendering variables being associated with a render engine for rendering the webpage, the one or more rendering variables comprising time of day and a last modified date value;

rendering the webpage using the one or more resources according to the values of the one or more rendering variables;

applying the set of filters to the webpage to generate an optimized webpage;

rendering the optimized webpage using the one or more resources according to the same values of the one or more rendering variables;

comparing the rendered webpage and the rendered optimized webpage;

determining if a transformation error occurred based on the comparing, wherein the transformation error comprises a pre-defined level of difference between the rendered webpage and the rendered optimized webpage;

identifying the one or more optimization filters as the set of optimal optimization filters if it is determined that the transformation error did not occur; and responsive to determining that the transformation error occurred, automatically modifying the set of filters to generate a subset of filters, wherein the subset of filters includes a subset of the one or more available optimization filters and the set of filters includes at least one of the one or more available optimization filters that is not included in the subset of filters.

13. The system of claim 12, wherein the retrieving the one or more resources comprises:

determining if the one or more resources were previously requested with respect to the webpage; and generating a request to one or more resource providers for the one or more resources if the one or more resources were not previously requested with respect to the webpage;

receiving the one or more resources in response to the request; and storing the one or more resources in local storage for later retrieval.

14. The system of claim 13, wherein retrieving the one or more resources for rendering the optimized webpage comprises retrieving the one or more resources from local storage.

15. The system of claim 13, the operations further comprising:

rendering the webpage a plurality of times using the one or more resources stored in local storage according to the values of the one or more rendering variables to generate a plurality of instances of the webpage;

comparing the plurality of instances of the webpage; and identifying stable regions of the webpage based on the comparing, wherein stable regions of the webpage comprise regions that are not changed in the plurality of instances of the webpage, wherein the comparing the rendered webpage and the rendered optimized webpage comprises comparing the stable regions of the rendered webpage and corresponding regions of the rendered optimized webpage.

16. The system of claim 12, the operations further comprising:

applying the subset of filters to the webpage to generate a second optimized webpage;

rendering the second optimized webpage using the one or more resources according to the same values of the one or more rendering variables;

comparing the rendered webpage and the rendered second optimized webpage;

determining if another transformation error occurred based on the comparing, wherein the another transformation error comprises a pre-defined level of difference between the webpage and the second optimized webpage; and identifying the one or more optimization filters of the subset of filters as the set of optimal optimization filters with respect to the webpage if it is determined that the another transformation error did not occur.

17. The system of claim 16, the operations further comprising:

modifying the subset of filters to generate another subset of filters when it is determined that the another transformation error occurred, wherein the another subset of filters includes a subset of the subset of the one or more available optimization filters and the subset of filters includes another one of the one or more available optimization filters that is not included in the another subset of filters.

18. The system of claim 16, the operations further comprising:

modifying the subset of filters to include a different combination of the one or more available optimization filters until it is determined that the another transformation error did not occur, if it is determined that the another transformation error occurred, wherein the set of filters include at least one of the one or more available optimization filters not included in the subset.

19. A non-transitory machine-readable medium comprising instructions stored therein, which when executed by a machine, cause the machine to perform operations comprising:

receiving a webpage for optimization;

generating a set of filters including one or more optimization filters for optimizing the webpage;

retrieving one or more resources for rendering the webpage;

setting the values for one or more rendering variables, the one or more rendering variables being associated with a render engine for rendering the webpage;

rendering the webpage using the one or more resources according to values of the one or more rendering variables;

applying the set of filters to the webpage to generate an optimized webpage;

rendering the optimized webpage using the one or more resources according to the same values of the one or more rendering variables;

comparing the rendered webpage and the rendered optimized webpage;

determining if a transformation error occurred based on the comparing, wherein the transformation error comprises a difference between the rendered webpage and the rendered optimized webpage;

storing the one or more optimization filters if it is determined that the transformation error did not occur; and automatically modifying the set of filters to generate a subset of filters responsive to determining that the transformation error occurred, wherein the subset of filters includes a subset of the one or more optimization filters and the set of filters includes at least one of the one or more optimization filters not included in the subset of filters.

20. The machine-readable medium of claim 19, the operations further comprising:

applying the subset of filters to the webpage to generate a second optimized webpage;

rendering the second optimized webpage using the one or more resources according to the same values of the one or more rendering variables;

comparing the rendered webpage and the rendered second optimized webpage;

determining if another transformation error occurred based on the comparing, wherein the another transformation error comprises a pre-defined level of difference between the webpage and the second optimized webpage; and storing the one or more optimization filters of the subset of filters with respect to the webpage if it is determined that the another transformation error did not occur.

* * * * *